(12) United States Patent
Trini Castelli

(10) Patent No.: US 7,144,132 B2
(45) Date of Patent: Dec. 5, 2006

(54) TWO-SIDED ILLUMINATED PANEL WITH UNIFORM ILLUMINATION

(76) Inventor: Clino Trini Castelli, Via Tivoli, 8, 20121 Milan (IT)

( * ) Notice: Subject to any disclaimer, the term of this patent is extended or adjusted under 35 U.S.C. 154(b) by 99 days.

(21) Appl. No.: 10/507,477

(22) PCT Filed: Mar. 17, 2003

(86) PCT No.: PCT/EP03/02770

§ 371 (c)(1),
(2), (4) Date: Sep. 13, 2004

(87) PCT Pub. No.: WO03/083529

PCT Pub. Date: Oct. 9, 2003

(65) Prior Publication Data

US 2005/0122716 A1    Jun. 9, 2005

(30) Foreign Application Priority Data

Mar. 28, 2002   (IT) .......................... MI2002A0655

(51) Int. Cl.
*F21V 5/00* (2006.01)
(52) U.S. Cl. ...................... 362/246; 362/158; 362/224; 362/225; 362/240; 362/247; 362/555; 362/812
(58) Field of Classification Search ................ 362/158, 362/812, 555, 247, 224, 225, 240, 246
See application file for complete search history.

(56) References Cited

U.S. PATENT DOCUMENTS

| | | | | |
|---|---|---|---|---|
| 5,345,325 A | * | 9/1994 | Twachtmann | ................ 349/64 |
| 5,673,999 A | * | 10/1997 | Koenck | ..................... 362/263 |
| 6,737,802 B1 | * | 5/2004 | Koyama et al. | ............ 313/506 |
| 6,971,758 B1 | * | 12/2005 | Inui et al. | ..................... 362/23 |
| 2001/0022721 A1 | * | 9/2001 | Konomi | ..................... 362/29 |

FOREIGN PATENT DOCUMENTS

| | | |
|---|---|---|
| DE | C-868 694 | 2/1953 |
| DE | C-40 37 076 | 4/1992 |
| EP | A-0 375 293 | 6/1990 |

* cited by examiner

*Primary Examiner*—Renee Luebke
*Assistant Examiner*—Mary Zettl
(74) *Attorney, Agent, or Firm*—Modiano & Associati; Albert Josif; Daniel O'Byrne

(57) ABSTRACT

A two-sided illuminated panel, comprising a first diffuser and a second diffuser arranged so as to face each other and adapted to form internally at least one chamber, the chamber being closed laterally, one or more light sources being supported laterally, and further comprising at least one partition arranged diagonally within the chamber and adapted to equalize the light emitted by the one or more light sources onto the first and second diffusers.

17 Claims, 6 Drawing Sheets

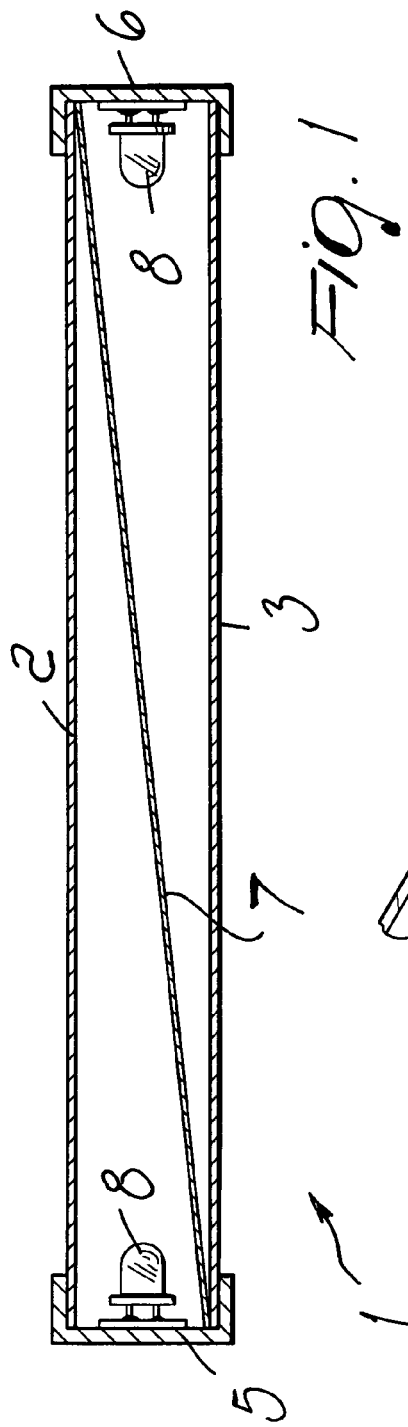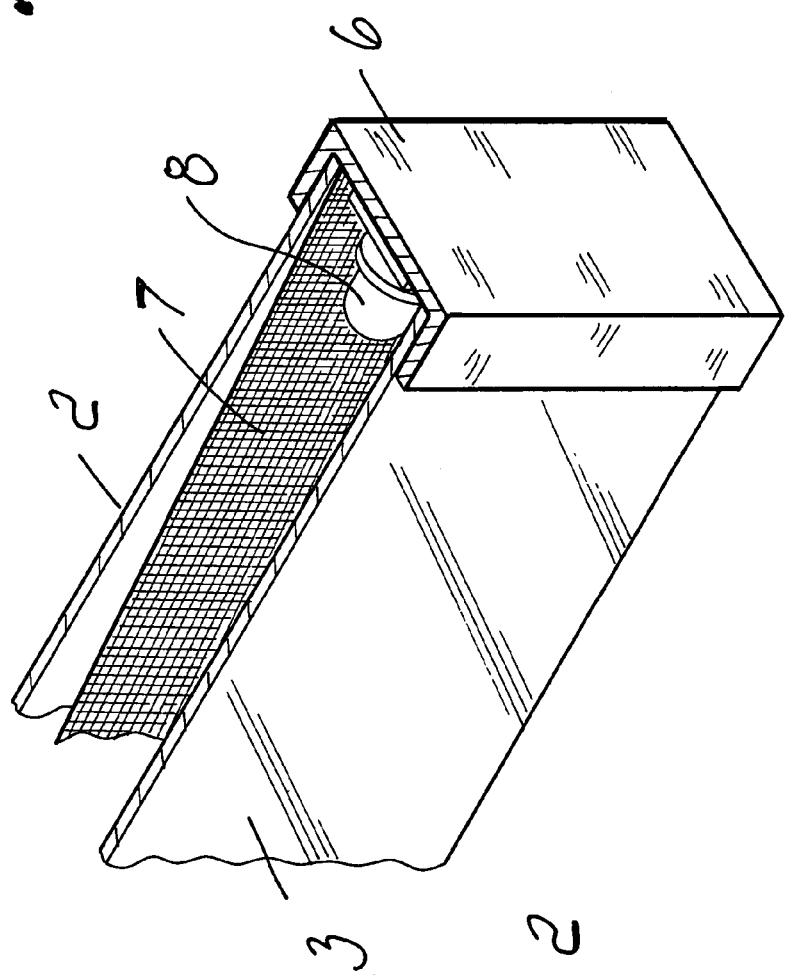

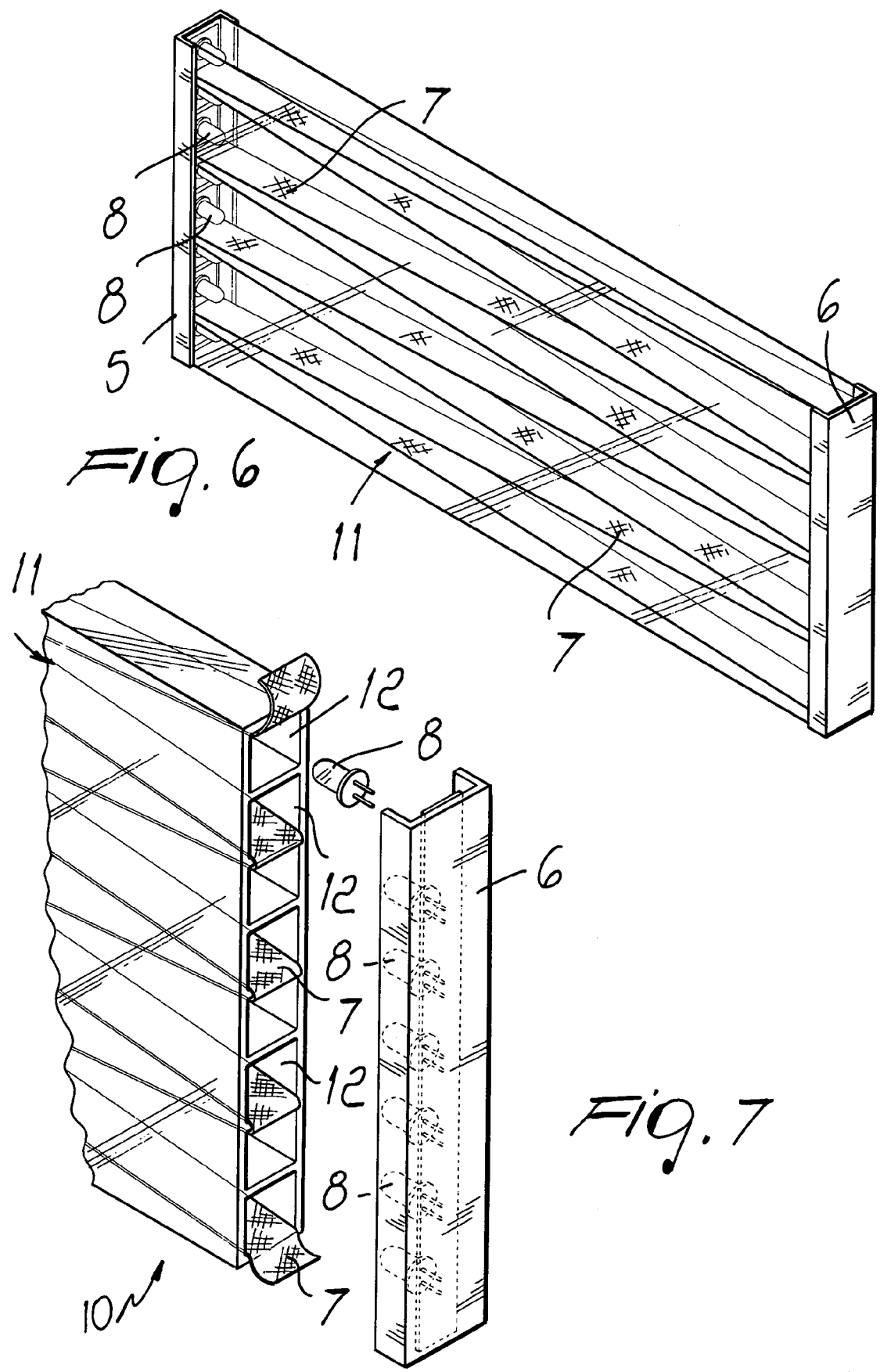

TWO-SIDED ILLUMINATED PANEL WITH UNIFORM ILLUMINATION

BACKGROUND OF THE INVENTION

As is known, illuminated panels are increasingly used in cities for advertising purposes or to provide information on traffic, as interior decoration elements, and the like.

Currently, the issues related to illuminated panels concern two very distinct aspects.

First of all, there is the apparent thickness of the device (panel), which is dictated by the light sources located inside the illuminated panels, which must ensure overall uniformity of the illuminated surface of the panel.

The use of fluorescent sources arranged directly below the diffuser (generally a sheet of plastics or an opalescent glass plate) entails that the sources are visible as a bright area, and this effect can be obviated only by moving the diffuser further away, consequently increasing the thickness of the entire panel.

Furthermore, the amount of light emitted can be excessive, indeed because of the need to have a large number of sources to be arranged as uniformly as possible.

The excessive thickness of an illuminated panel or box, especially for indoor use or for application to partitions, shop interiors, etcetera, is not only an aesthetic penalty but also a constructive one.

The second issue relates to the use of the light sources, which substantially range from fluorescent tubes to more recent LEDs. Fluorescent tubes are inexpensive but bulky and have a relatively short useful life.

On the other hand, LEDs are far more compact and expensive, but have an extremely long useful life.

Both light sources suffer a problem in terms of equalization of the illuminated surface of the panel, but the use of LEDs reduces at least the decisive factor of access to the light sources for their maintenance.

One known solution for reducing the thickness of illuminated panels and achieving an energy saving is based on the conversion of the box or panels into hollow bodies with light sources arranged at the inner sides of the panel. The material used for this solution is constituted by a transparent film with microprisms on a single face, which is arranged both on the transparent/opalescent surface of the diffuser and on the back, directly behind the diffuser. Since the orientation of the prisms extends in the direction of the two lateral sources, the light strikes the film with a very shallow angle of incidence and tends to be reflected back toward the inside of the box instead of escaping through the diffuser.

These multiple reflections would lead to no apparent luminosity if one did not intervene, generally in the area that lies furthest from the sources (i.e., the center of the panel), with a light extractor, which converts the multiple specular reflection into a reflection of light in all directions. Extractors are generally constituted by variously configured opaque white surfaces (Lambertian reflection of light).

For example, such surfaces can be constituted by white triangles that become larger as they lie further away from the source, with the goal of equalizing the light reflected in all directions and of having an impression of uniform illumination between the outer regions (near the sources) and the center of the panel.

Another configuration of more sophisticated extractors is constituted by concentrations of opaque white lines that are more or less fixed in relation to the multiple reflection points of the sources, which appear to be mirrored in virtual positions.

However, the solution described above has problems, such as for example the penetration of dust into the device (due to the need for regular maintenance), which greatly reduces its luminous output over time.

The use of LEDs can obviate this drawback, by virtue of the lack of maintenance, as explained earlier, and can also obviate the presence of reflectors behind the fluorescent lamps, which are designed to convey the light at a very shallow angle with respect to the films (the individual LEDs have a lens that already performs this task). However, the cost of transparent films with microprisms on a single face is high, and therefore this is not an attractive solution in terms of cost.

Moreover, devices based on the use of microprismatic films suffer the drawback of requiring duplication of the devices inside the boxes in order to achieve their two-sided illumination, which is increasingly required in environmental signage.

SUMMARY OF THE INVENTION

The aim of the present invention is to provide a two-sided illuminated panel with uniform illumination combined with a reduced thickness.

Within this aim, an object of the present invention is to provide a two-sided illuminated panel that combines a very low thickness with a long useful life, substantially without maintenance.

Another object of the present invention is to provide a two-sided illuminated panel that has a reduced cost, such as to compensate for the use of LEDs.

Another object of the present invention is to provide a two-sided illuminated panel in which the lighting device accommodated inside the box or panel is substantially separate from said panel.

Another object of the present invention is to provide a two-sided illuminated panel that is highly reliable, relatively simple to provide, and at competitive costs.

This aim and these and other objects that will become better apparent hereinafter are achieved by a two-sided illuminated panel, comprising a first diffuser and a second diffuser arranged so as to face each other and adapted to form internally at least one chamber, said chamber being closed laterally, characterized in that it comprises one or more light sources supported laterally, and in that it comprises at least one partition arranged diagonally within said chamber, which is adapted to equalize the light emitted by said one or more light sources on said first and second diffusers.

BRIEF DESCRIPTION OF THE DRAWINGS

Further characteristics and advantages of the invention will become better apparent from the description of preferred but not exclusive embodiments of the illuminated panel according to the present invention, illustrated only by way of non-limitative example in the accompanying drawings, wherein:

FIG. 1 is a transverse sectional view of a two-sided illuminated panel according to the present invention;

FIG. 2 is a partial perspective view of the panel of FIG. 1;

FIG. 6 is a perspective view of a third embodiment of the illuminated panel according to the invention;

FIG. 7 is a partial exploded perspective view of FIG. 6, illustrating the illuminated panel according to its third embodiment;

DESCRIPTION OF THE PREFERRED EMBODIMENTS

Figure 3:
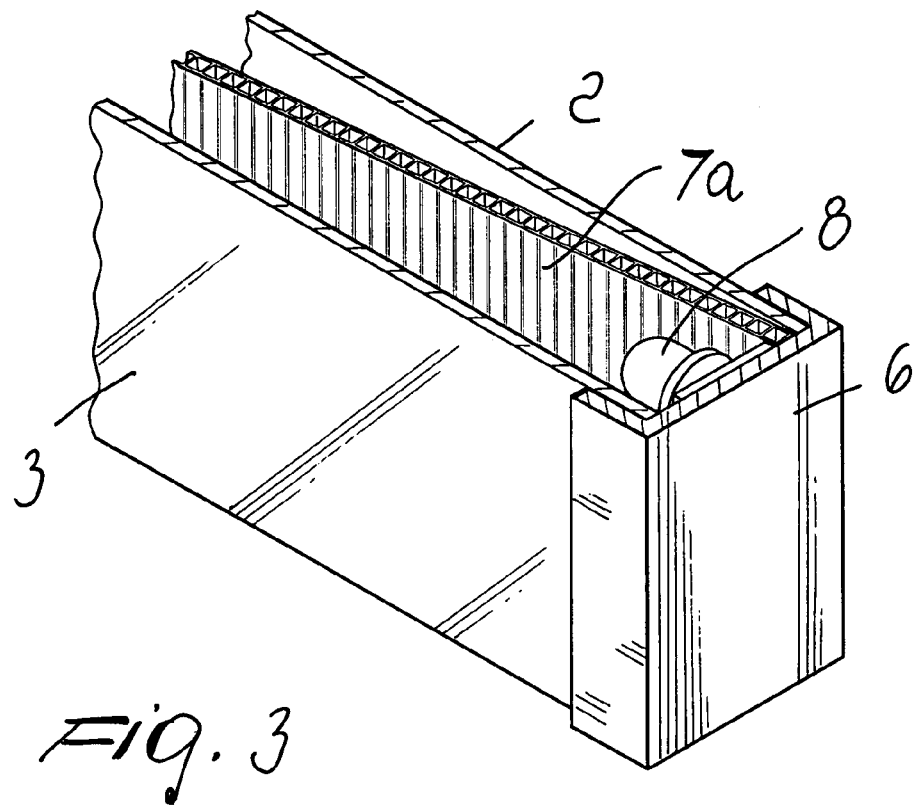
FIG. 3 is a partial perspective view of a variation of the panel of FIG. 1.

With reference to the figures, the illuminated panel or box according to the present invention, generally designated by the reference numeral 1, comprises a first and a second diffusers, which are arranged so as to face each other and are suitable to form at least one chamber 4 internally.

The first diffuser 2 and the second diffuser 3 are preferably opalescent diffusers.

The particularity of the invention resides in that it provides, within the chamber 4 formed by the two diffusers 2 and 3 and closed laterally by two covering elements 5 and 6, at least one partition that is arranged diagonally inside the chamber and is adapted to equalize the light emitted by one or more light sources. For example, the partition can be constituted by an additional diffuser element 7, of the Lambertian type, i.e., semitransparent, arranged diagonally within the chamber 4.

Another possibility is to provide the partition by means of a transparent alveolate panel 7a, made for example of plastics, which is adapted to produce refractions and diffractions of the light emitted by the light sources (FIG. 3). Moreover, if transparent alveolate plastic panels are used also for the two external diffuser elements, the light emitted by the panel acquires an aesthetic value that is characteristic of the present invention. It is in fact possible to achieve an innovative three-dimensional depth although the panel is very thin.

Substantially, the covering elements 5 and 6 are each adapted to support preferably a plurality of LEDs 8, which are accordingly arranged laterally with respect to the longitudinal extension of the panel, with the partition 7-7a arranged diagonally within the chamber 4, so as to cover one of the batteries or pluralities of LEDs 8 and leave the other one exposed instead.

The diagonal partition 7-7a can be provided as a semitransparent white partition, as an alveolate partition with microcannulas, and can be provided for example as a "Lambertian" gauze with localized mesh density increase, as described in greater detail hereinafter.

The LED or battery of LEDs 8 used can be LEDs with a different beam according to the requirements, i.e., the aperture angle of the light beam can be selected according to the power of the LEDs, to the thickness of the illuminated panel and to its width.

Substantially, the diffuser element 7 is made of highly diffusive but also semitransparent material, in order to allow the light of the LEDs 8 located behind it filter through, and moreover, since it is inclined diagonally, and since the light of the LEDs has a very narrow beam, said LEDs strike the diffusing surface of the diffuser element 7 tangentially. Accordingly, this entails a double positive effect, i.e., the equalization of the light of the two batteries of LEDs 8 and the automatic correction of any anomalies in the diffusion of one of the two batteries 8, allowed by the semitransparency of the partition or Lambertian diffuser element 7. The transverse partition is in fact generally made of materials that are structurally scarcely stable (Lambertian fabric, panel made of transparent alveolate plastics). Often its arrangement inside the panel does not correspond to the diagonal, thus producing two non-identical chambers. This phenomenon is automatically compensated by the device, since the partition itself is semitransparent.

For example, when using a fabric made of white cotton in the form of an elasticized gauze, as shown in FIG. 2, which has a wider weft or warp, it is possible to diffuse completely the tangential light of the LEDs (which cannot pass through the diffuser 7 because its angle is too shallow) but allow the passage of the light that is reflected in all directions and diffused and is present in the two triangular sections into which the chamber 4 is divided by the presence of the partition or diffuser element 7.

The solution proposed above, in addition to being considerably inexpensive with respect to the solutions currently used, has the advantage of great constructive simplification, since the partition or diffuser element 7 can be made of elastic material that is simply stretched along the diagonal of the cross-section of the illuminated panel 1, utilizing functionally the spaces that are not occupied by the LEDs or also by any fluorescent tubes, thus contributing to a great reduction in the thickness of the illuminated panel.

Figure 4:
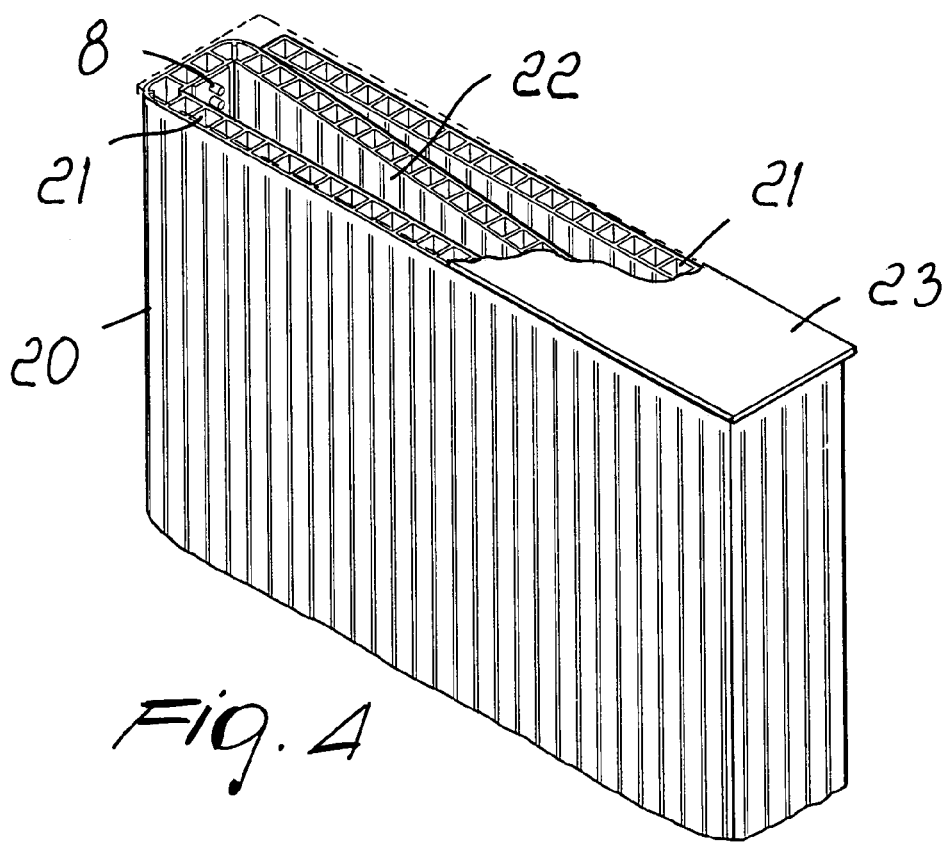
FIG. 4 is a perspective view of a second embodiment of the panel according to the invention.

FIG. 4 is a perspective view of a second embodiment of the illuminated panel according to the present invention.

In this second embodiment (FIG. 4), the illuminated panel is constituted, like in the preceding embodiments, by a first diffuser and a second diffuser, which face each other and form a chamber between them. In this case, however, the first and second diffuser elements are formed by an alveolate structure that is obtained with an alveolate sheet, made for example of polycarbonate.

Substantially, the sheet has a plurality of cannulas 21 that are arranged at right angles and are adjacent one another. The panel or box shown in FIG. 4 is provided by cutting the wall between two cannulas, at the points where a fold is to be provided, so as to fold the sheet at said cuts and arrange it in the configuration shown in FIG. 4.

In this manner, the partition of the preceding embodiments is formed by a portion 22 of the sheet, designated by the reference numeral 20, folded diagonally onto the opposite portion of the sheet that constitutes one of the first or second diffuser elements.

Accordingly, instead of having two separate diffuser elements that are coupled in a parallel configuration, the panel according to the embodiment of FIG. 4 is obtained by means of a single element folded so as to form a substantially box-like body, in which the cannulas 21 are arranged vertically. One or more light sources, constituted for example by a battery of LEDs 8, are provided inside the spaces formed by the diagonal portion 22 of the sheet, as in the previous embodiments.

The batteries of LEDs 8 can be applied for example by means of double adhesive to the inner vertical walls of the panel thus formed.

Substantially, the diagonal portion 22 of the sheet forms two triangular chambers, each of which contains a battery of LEDs 8.

Optionally, a reflective element 23 can be arranged so as to close the box like body upwardly. This reflective element or panel 23 has an inner surface (i.e. the surface which faces the interior space of the box-like body) that is made of or covered with a reflective material which enhances the luminous efficiency and uniformity.

Such panel has the effect of reflecting towards the inner space of the box-like body that part of the luminous flux that would be lost outside of the box-like body.

In addition, the panel 23 enhances, as before explained, the uniformity of the luminous effect, contributing to homogeneously distribute the luminous flux inside the box-like body along the walls thereof.

The proposed solution provides great structural solidity, great constructive simplicity, and the possibility to provide boxes whose dimensions and thickness can be selected at will, since the material can be obtained in any length and width, while the thickness is determined only by the folding of the sheet.

The batteries of LEDs 8 arranged as shown in FIG. 4 allow to obtain a very uniform illumination around the box at right angles to the cannula of the alveolate sheet. This phenomenon is enhanced by the extreme concentration of the light of the LED. Directional unevenness is produced by the fact that each individual LED of a battery is orientated in a slightly different manner; instead of constituting an undesirable defect, this allows to obtain a considerable uniformity of light distribution. Furthermore, each one of the two batteries of LEDs 8, arranged substantially opposite each other, covers the entire angle of 360° around the box and therefore in every point in space there is the contribution of both light beams of the two batteries of LEDs.

Furthermore, two-sidedness is achieved as an intrinsic result of the technical solution used. In order to obtain a single-sided device it is in fact sufficient to give a mirror finish to one of the internal surfaces of the illuminated panel, i.e., one of the internal surfaces of the opalescent diffusers 2 and 3, with a consequent and considerable increase in light emission orientated in a single direction.

In terms of application, this concept lends itself to the construction of sealed illuminated panels or boxes made of plastics with low-voltage contacts that are simple to install. Accordingly, the sealed illuminated box or panel, designated by the reference numeral 10 in this case, comprises an extruded body 11 made of transparent material, which is divided into multiple chambers 12 and is closed laterally by covering elements that are similar to the covering elements 5 and 6 and are therefore designated by the same reference numerals. The covering element supports, like the first embodiment, multiple LEDs 8, each of which faces a respective chamber 12.

In this case, the Lambertian diffuser element or partition 7 is constituted by a band that runs diagonally from one end to the other of each chamber 12, passing into the directly adjacent chamber, in a continuous fashion.

The band 7 is therefore arranged as shown in FIG. 6, in a zigzag fashion, passing from one chamber 12 to the chamber that is directly adjacent to it.

The band 7 can be formed by a white band of elasticized gauze or by means of a band of opalescent elastomer.

Figure 9:
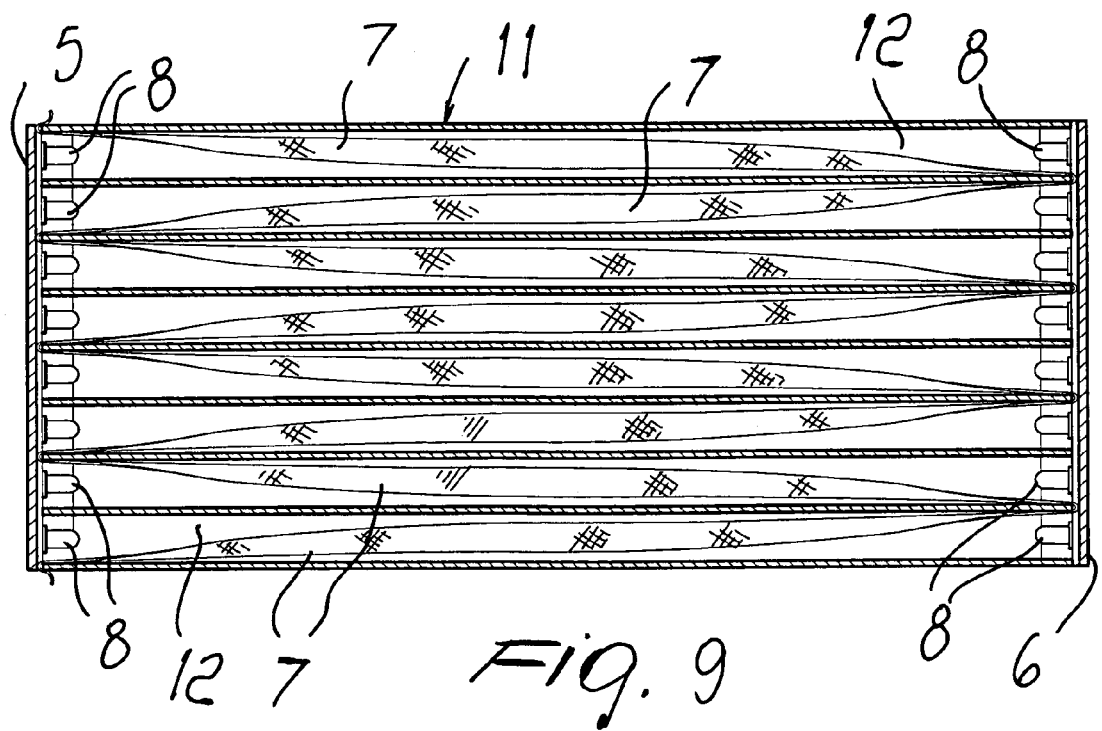
FIG. 9 is a schematic side view of a variation of the illuminated panel according to its third embodiment.

In a variation of this third embodiment, the band 7 can be arranged in a helical configuration (i.e., with a 180° rotation) in order to increase the diffusion surfaces at the center of the illuminated box 10, as shown in FIG. 9.

Figure 5:
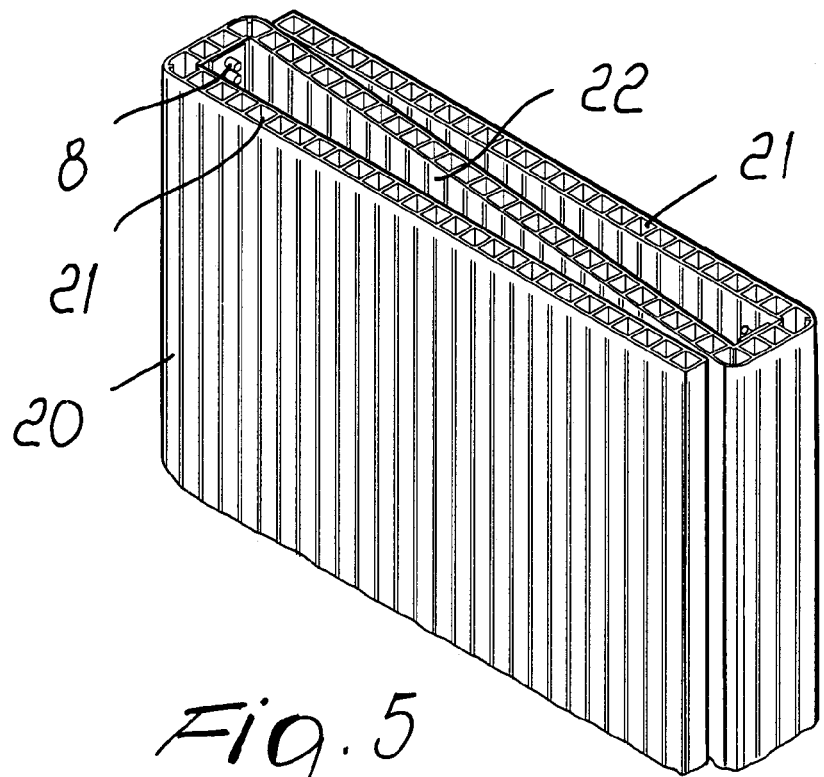
FIG. 5 is a perspective view of a variation of the second embodiment of the panel of FIG. 4.

FIG. 5 is a perspective view of a variation of the second embodiment of the panel shown in FIG. 4, in which the first and second diffusers and the transverse partition are formed as a single transparent alveolate body with a Z-fold.

Figure 10:
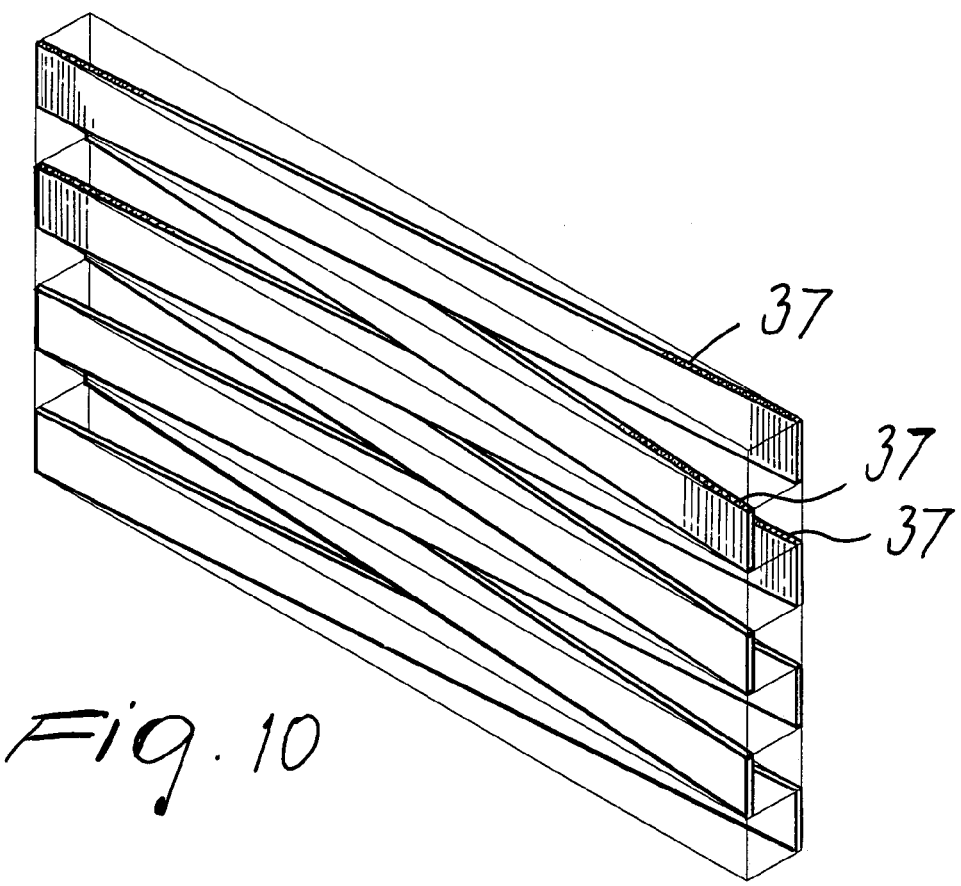
FIG. 10 is a perspective view of a fourth embodiment of the illuminated panel according to the invention.
Figure 8:
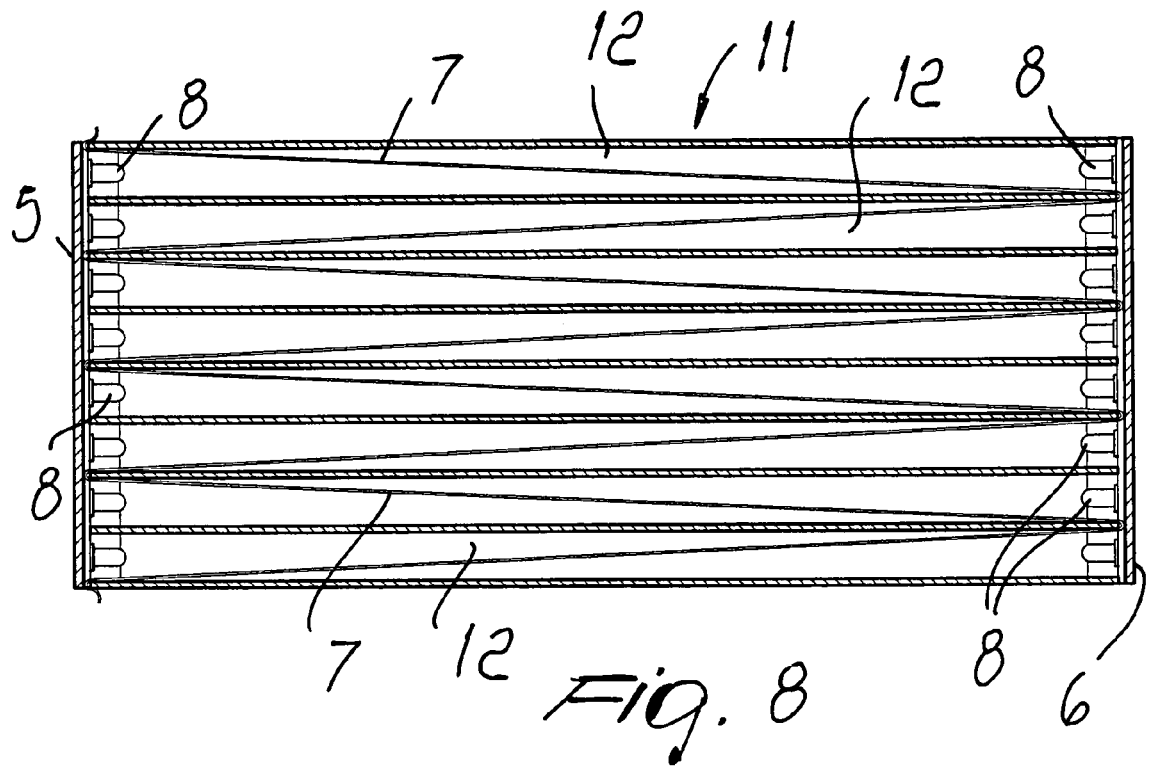
FIG. 8 is a schematic side view of the illuminated panel according to its third embodiment.
Figure 11:
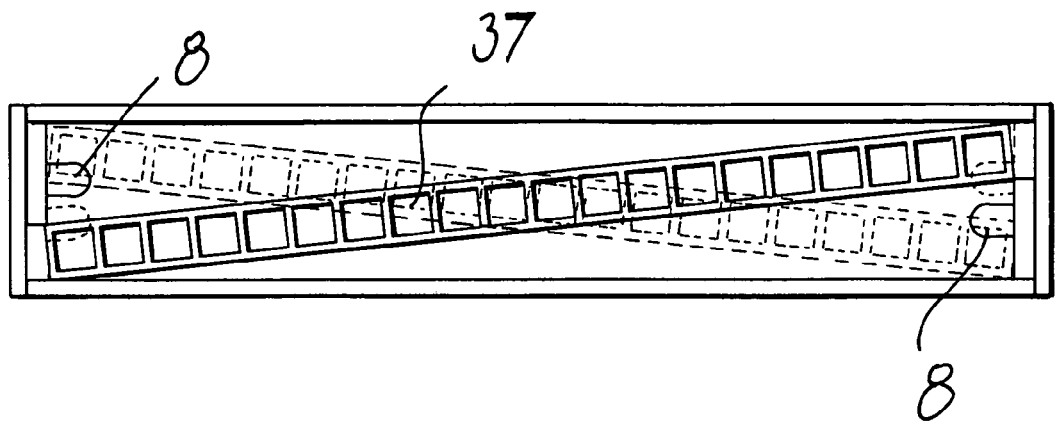
FIG. 11 is a transverse sectional view of the illuminated panel of FIG. 10.
Figure 12:
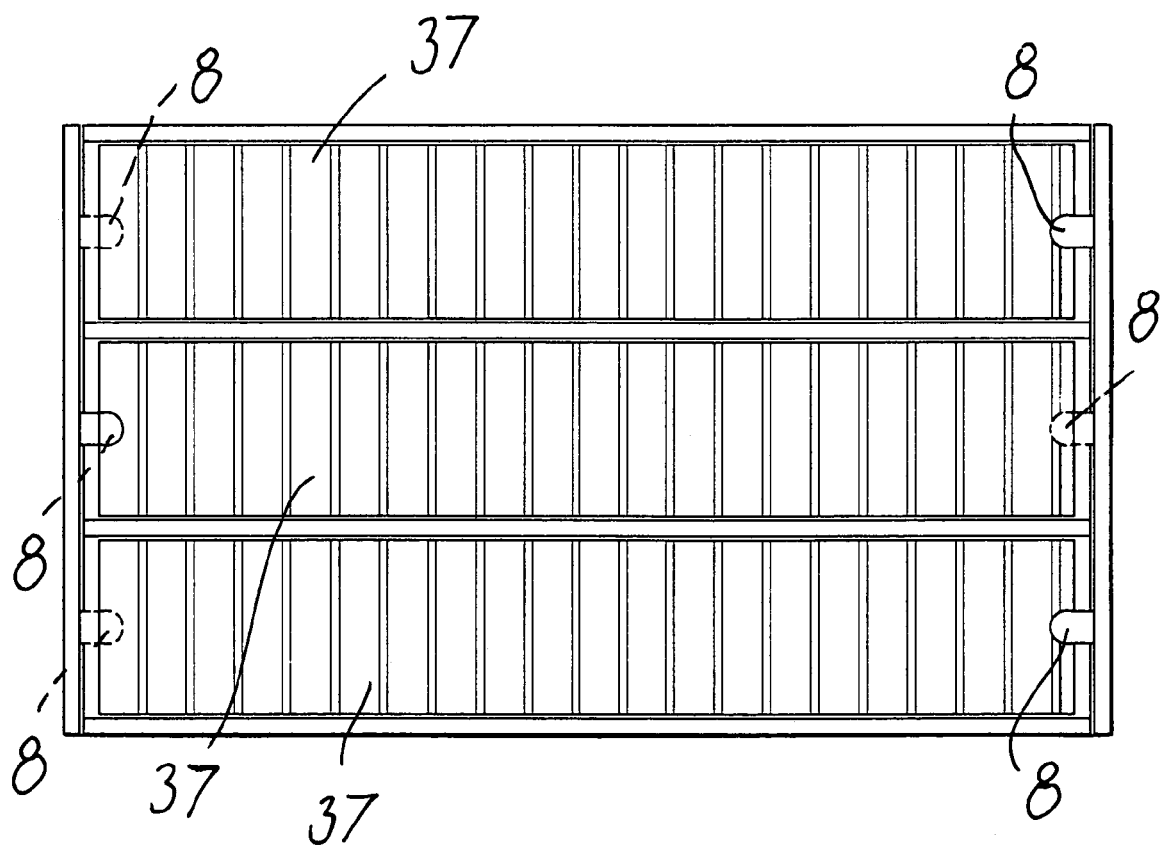
FIG. 12 is a side view of the illuminated panel shown in FIG. 10.

FIGS. 10 to 12 illustrate a fourth embodiment of the illuminated panel according to the present invention. The difference of this last embodiment consists in that the partition, designated by the reference numeral 37 in this case, is provided by means of an alveolate body with cannulas that are arranged at right angles to the direction of the light emitted by the LEDs 8. The partition, moreover, is arranged diagonally inside each chamber or cannula of the body of the panel. Each chamber faces a respective LED 8, and the chambers or cannulas are arranged parallel to the direction of propagation of the light of the LEDs 8 and therefore at right angles to the cannulas of each partition 37.

The partitions are arranged, in this case, diagonally to the front and rear faces of the panel body, in a zigzag fashion, at right angles to the zigzag orientation of FIGS. 6 to 9.

In practice it has been found that the two-sided illuminated panel according to the invention fully achieves the intended aim and objects, since it can be produced with an extremely low thickness, with two-sided emission, maintaining uniform illumination.

Moreover, the panel according to the invention, in its various embodiments, can be used for interior decoration, both for decorative purposes and with a space separation effect, or also to indicate emergency exits. As regards possible outdoor uses, the panel can be used for roadside billboards, advertising, and the like.

The illuminated panel thus conceived is susceptible of numerous modifications and variations, all of which are within the scope of the appended claims; all the details may further be replaced with other technically equivalent elements.

In practice, the materials used, as well as the contingent shapes and dimensions, may be any according to requirements and to the state of the art.

The disclosures in Italian Patent Application No. MI2002A000655 from which this application claims priority are incorporated herein by reference.

What is claimed is:

1. A two-sided illuminated panel, comprising a first diffuser and a second diffuser arranged so as to face each other and adapted to form internally at least one chamber, said chamber being closed laterally, comprising one or more light sources supported laterally, and further comprising at least one partition arranged diagonally within said chamber, which is adapted to equalize the light emitted by said one or more sources on said first and second diffusers, said at least one partition being a transparent alveolate partition comprising cannulas arranged at right angles to a light emission setting of said one or more light sources.

2. The illuminated panel according to claim 1, wherein said one or more light sources are LEDs.

3. The illuminated panel according to claim 2, wherein said partition is arranged diagonally within said chamber of said illuminated panel, so as to cover said one or more LEDs supported by one of covering elements arranged to close laterally the chamber and so as to leave exposed said one or more LEDs supported by another one of said covering elements.

4. The illuminated panel according to claim 1, wherein said first and second diffusers are opalescent diffusers.

5. The illuminated panel according to claim 1, wherein said first and second diffusers are transparent alveolate panels.

6. The illuminated panel according to claim 1, further comprising a panel arranged so as to close upwardly said at least one chamber, said panel having a reflective inner surface.

7. A two-sided illuminated panel, comprising a first diffuser and a second diffuser arranged so as to face each other and adapted to form internally at least one chamber, said chamber being closed laterally, comprising one or more light sources supported laterally, and further comprising at least one partition arranged diagonally within said chamber, which is adapted to equalize the light emitted by said one or more light sources on said first and second diffusers, said partition being a transparent alveolate panel, adapted to provide refraction and diffraction of the light emitted by said one or more light sources, said first and second diffusers being transparent alveolate panels, said transparent alveolate diffusers and said transparent alveolate partition comprising cannulas arranged at right angles to the light emission setting of said one or more light sources.

8. The illuminated panel according to claim 7, wherein said diffusers and said partition are formed monolithically.

9. A two-sided illuminated panel, comprising a first diffuser and a second diffuser arranged so as to face each other and adapted to form internally at least one chamber, said chamber being closed laterally, comprising one or more light sources supported laterally, and further comprising at least one partition arranged diagonally within said chamber, which is adapted to equalize the light emitted by said one or more light sources on said first and second diffusers, said first and second diffuser elements forming a plurality of chambers arranged parallel and adjacent to each other.

10. The illuminated panel according to claim 9, wherein said covering elements support a plurality of LEDs, each LED facing a respective one of said chambers, a partition being arranged diagonally within each one of said chambers, said partition being adapted to equalize the light emitted by said LEDs.

11. The illuminated panel according to claim 10, wherein said partition is a Lambertian diffuser element constituted by a continuous band that is adapted to lie diagonally within a chamber in order to pass into the directly adjacent chamber diagonally in a zigzag configuration.

12. The illuminated panel according to claim 11, wherein said band is a white band of elasticized gauze.

13. The illuminated panel according to claim 11, wherein said band is an opalescent elastomeric band.

14. The illuminated panel according to claim 11, wherein said band is a continuous band that is adapted to twist in a helical fashion inside each one of said chambers formed in said panel.

15. The illuminated panel according to claim 14, wherein said band arranged in a helical shape is rotated through 180° over the entire length of each one of said chambers formed in panel.

16. The illuminated panel according to claim 10, wherein said partition is constituted by a transparent alveolate panel that is arranged diagonally within each one of said chambers, said panel being adapted to produce refraction and diffraction of the light emitted by said LEDs.

17. The illuminated panel according to claim 16, wherein said transparent alveolated parition comprising cannulas arranged at right angles to the direction of emission of the light of said LEDs.

* * * * *